United States Patent
Donovan

[15] 3,689,976
[45] Sept. 12, 1972

[54] COIL TRANSFER APPARATUS

[72] Inventor: Glenn R. Donovan, Kettering, Ohio

[73] Assignee: A. O. Smith Corporation, Milwaukee, Wis.

[22] Filed: April 15, 1971

[21] Appl. No.: 134,182

[52] U.S. Cl. .................................................29/205 D
[51] Int. Cl. .................................................H02k 15/06
[58] Field of Search.............29/205 D, 205 R, 205 C

[56] References Cited

UNITED STATES PATENTS

| 2,432,267 | 12/1947 | Adamson | 29/205 R |
| 3,559,268 | 2/1971 | Droll | 29/205 R |

*Primary Examiner*—Thomas H. Eager
*Attorney*—Andrus, Sceales, Starke & Sawall

[57] ABSTRACT

Prewound coils are placed into stator slots of a dynamoelectric machine by an insertion apparatus which has a plurality of fixed blades arranged in a circle within the inside diameter of the stator. The blades are spaced to provide blade gaps corresponding in position to the stator slots, and a piston driven stripper operating within the circle of blades inserts the coils through the gaps and into the stator slots. The stripper carries movable blades that alternate with the fixed blades, and the blade gaps are off-center between the movable and fixed blades. The movable blades are removably attached to the stripper.

5 Claims, 5 Drawing Figures

PATENTED SEP 12 1972 3,689,976

INVENTOR
GLENN R. DONOVAN

BY

ATTORNEYS

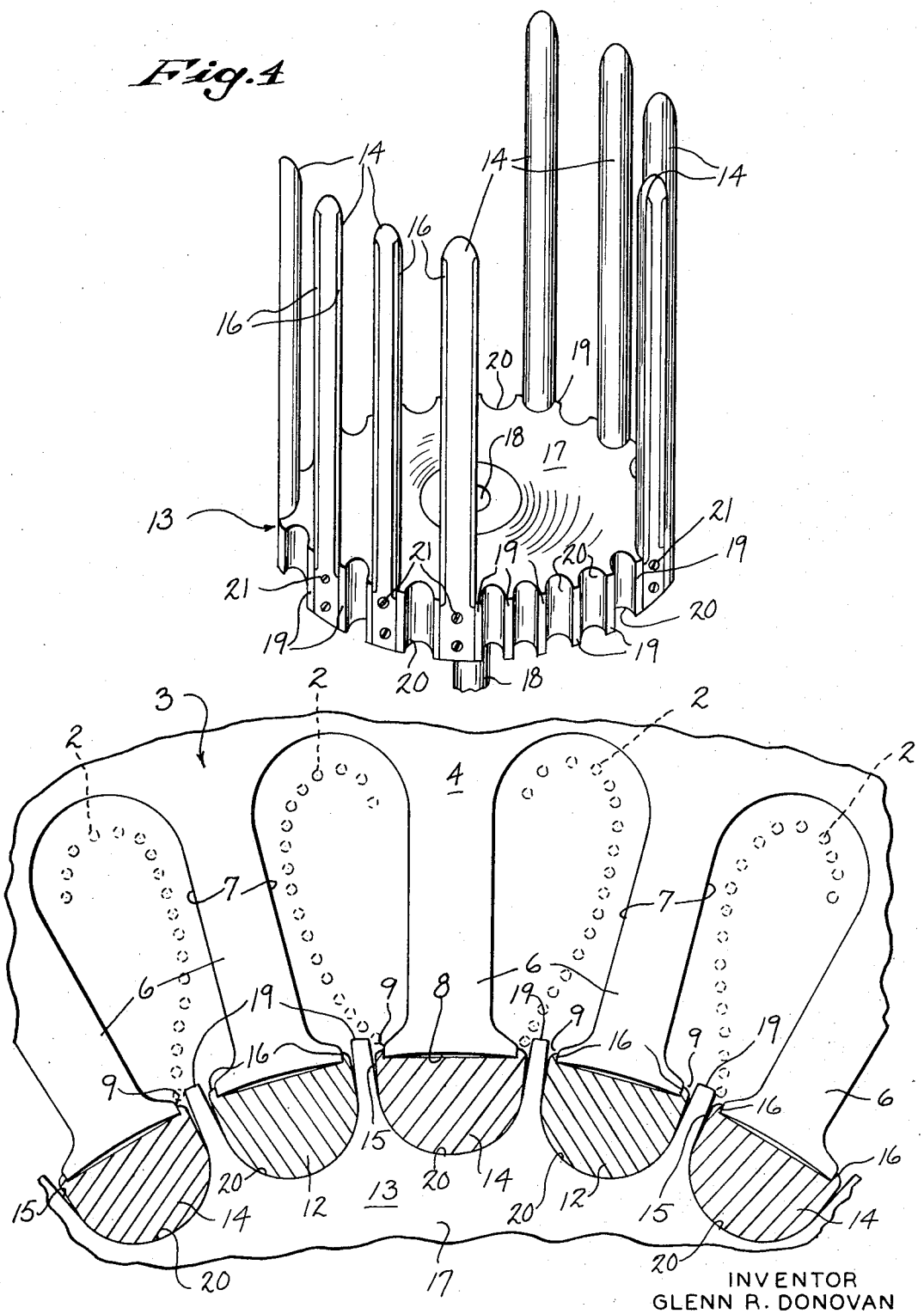

COIL TRANSFER APPARATUS

BACKGROUND OF THE INVENTION

This invention relates to winding of dynamoelectric machines and particularly to apparatus for inserting prewound coils into the slots of stators.

Apparatus have been developed that mechanically insert a plurality of prewound coils into the stator slots of electric motors, thus eliminating the time consuming practice of individually inserting each coil by hand. One such apparatus is shown in U.S. Pat. No. 2,432,267 to Adamson, where there is shown a slotted cylinder that fits inside the stator bore. Coils are placed in cylinder slots and the two longitudinal sides of the coils are inserted into the stator slots by a stripper which is driven through the inside of the slotted cylinder. When the coil is inserted, the end loops of the coils fold over the top and bottom of the stator to some degree.

There are similar devices that operate within general principles taught by the above Adamson patent. For machines having laminated stators with slots extending straight through the stator laminations, a plurality of blades arranged in a circle within the stator bore comprise the slotted cylinder. The number of blades provide gaps therebetween which correspond to the number of stator slots.

To align the blade gaps of such an apparatus with the stator slots, the blades have rims along their elongated edges to straddle the stator laminations between stator slots. The coils are placed in these blade gaps and when the stator is fitted on the apparatus a stripper with teeth that fit through the blade gaps strokes through the apparatus and pushes the coils into the stator slots.

Several problems arise with such apparatus and hamper its maximum utilization. It has been found that coil wire of certain sizes will tend to wedge or lock in the blade gaps, thus damaging the coils or jamming the winding operation. Depending on the ratio of the gap width to the wire diameter, it has been found that where stators having certain prescribed wire sizes are desired, the coil insertion tools having the unfavorable gap widths must either have the blades changed or the entire apparatus must be replaced with the proper apparatus. In either case, the operation is expensive, and only a limited number of wire sizes can be inserted.

A further difficulty that arises in such apparatus is in the disposition of the end loops of the coils. The end loops are supposed to bend over the top of stator between the slots into which the sides of each coil are inserted. This occurs as the stripper nears the top of its stroke. However, in the process of bending over the stator, the end loops sometimes interfere with other loops and the end turning may be blocked, causing coil deformation and non-uniformity in the winding.

The presently used apparatus is limited as to the amount of wire that can be inserted into the stator slots. Although it is often desirable to fill the slots as much as possible, present insertion tools can insert only 75 percent or less of the wire which the slots can contain. This problem is due primarily to the tendency of the wire to column up or stack in the slots, so that the wire blocks the slot opening before the slot is full.

These and other similar difficulties with present apparatus cause expense and inefficiency in winding insertion processes.

SUMMARY OF THE INVENTION

The invention is directed to the solution of the above mentioned problems and has additional advantages that appear in the drawings and description.

The apparatus of the invention is a coil insertion tool for dynamoelectric stators that is versatile in use and does not require expensive replacement or alteration to be used for all normal wire sizes. The apparatus accomplishes a high percentage of stator slot fill and avoids difficulties with end turn blocking of the coil loop ends as they bend over the end of the stator.

To provide these and other advantages, the coil transfer apparatus of the invention, has a coil insertion cylinder defined by elongated members spaced around the circumference of the cylinder. The elongated members are adapted for insertion within a stator bore and the gaps between the elongated members are aligned with the stator slots for insertion of coil wire through the gaps and into the stator slots. A stripper is disposed within the cylinder and has teeth which ride in the gaps between the elongated members and the openings of the stator slots as the stripper is operated to stroke relative to the stator bore.

In accordance with the invention, the stripper carries a plurality of elongated members which are movable blades alternated between the elongated members that are fixed to a base of the cylinder. The surfaces of the elongated members which are on the inside diameter of the cylinder are beveled or rounded to receive wire coil in the gaps between adjacent members. The movable blades are beveled or rounded at a different dimension to shape the gaps off center, thus to avoid locking or wedging of coil wire of any usual size as the stripper inserts the wire through the gaps. By guiding the wire to a side of each slot, this feature also avoids column stacking as the wire fans out into the slots and thus tends to fill the slots more completely.

In another feature of the invention, the movable blades are easily removable from the stripper, and can be replaced with blades of different dimensions in accordance with the optimum blade gaps or slot width for inserting wire of any particular size. If it is desired to have a different slot width or shape, the removable blades can be simply replaced with blades that provide the proper dimension.

The invention thus provides apparatus which may be used for many different wire sizes and obtains efficient operation in that more coil wire may be inserted into the stator slots, and damage or tangling of coil wires is avoided in the stator slots and at the loop ends of the coils.

DRAWINGS

The drawings illustrate the best mode presently contemplated for carrying out the invention.

In the drawings:

FIG. 4 is an enlarged perspective view of the stripper; and

FIG. 5 is an enlarged partial cross section of the stator with the transfer apparatus in place.

DESCRIPTION

Figure 3:
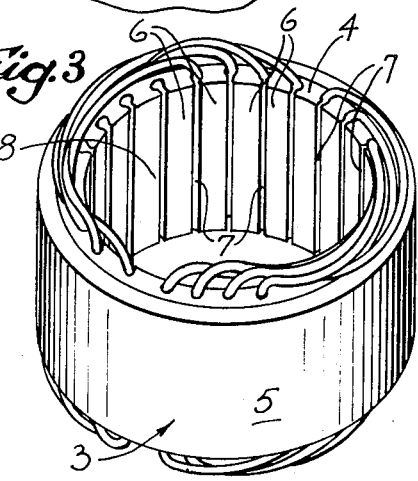
FIG. 3 is a perspective view of a wound stator that fits over the apparatus of FIG. 1.

Illustrated in the drawings is a coil transfer apparatus 1 which is operated to insert a series of prewound stator coils 2 in place in a dynamoelectric stator 3 which is shown in FIG. 3.

The stator has the usual stack of laminations 4 secured in an outer housing 5. Laminations 4 have a plurality of stator teeth 6 forming stator slots 7 between adjacent teeth and opening to the stator bore 8. As shown best in FIG. 5, stator teeth 6 are broadened on their ends at bore 8 to define narrowed mouths 9 for stator slots 7. The stator shown has a number of slots sufficient to accept coils 2 for a two pole winding.

Figure 1:
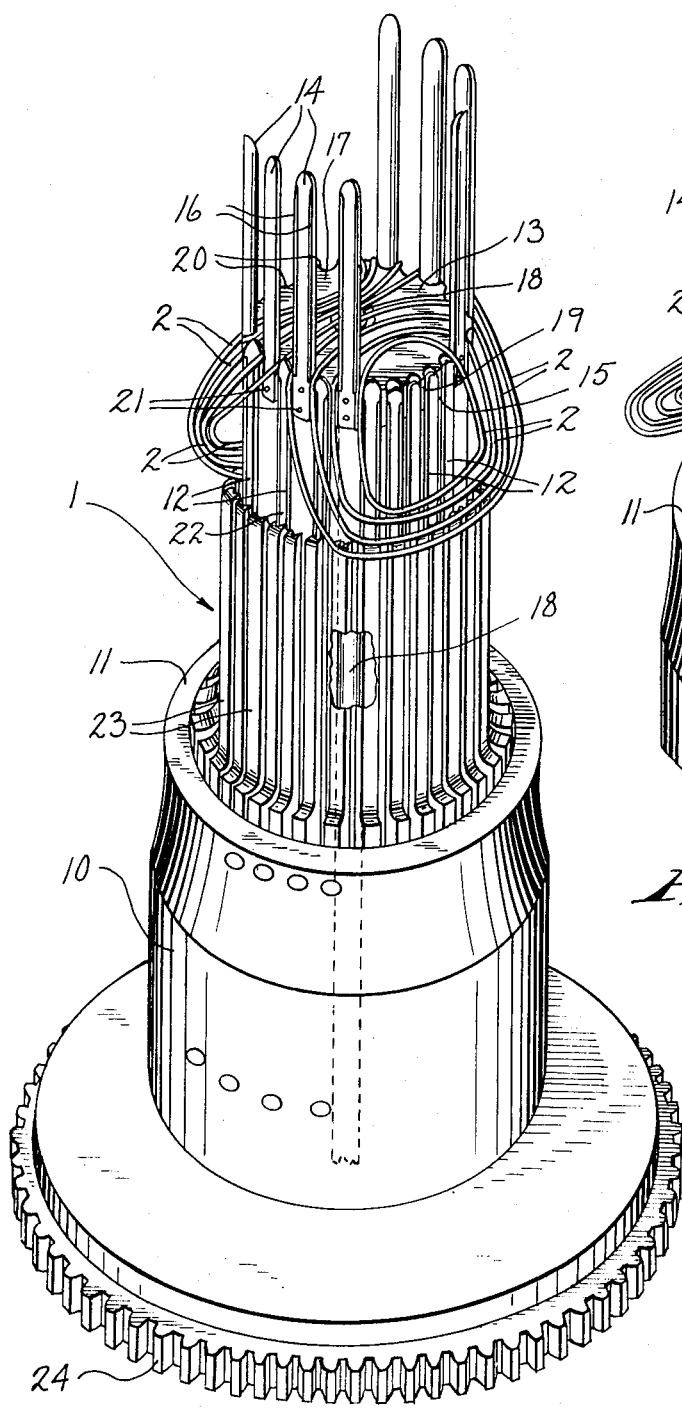
FIG. 1 is a perspective view of the apparatus, with the stripper in one position.

Referring particularly to FIG. 1, coil transfer apparatus 1 has a base 10 which is a hollow cylinder with a top rim 11. A cylindrical body of the apparatus is defined primarily by a series of elongated members including fixed blades 12 extending upward from rim 11. The diameter of the body is such as to fit within the bore of stator 3.

In accordance with the invention, a stripper 13 operates within the cylinder defined by fixed blades 12, and the stripper carries a plurality of movable blades 14 in the same cylindrical perimeter of fixed blades 12, and which are positioned between adjacent fixed blades 12. Elongated slots are provided in the cylindrical body by blade gaps 15 between adjacent blades. So that blade gaps 15 are aligned with stator slots 7, each blade 12 and 14 is formed with rims 16 on opposite longitudinal edges and adapted to straddle the ends of stator teeth 6, as shown best in FIG. 5. Thus, the stator may be dropped over the cylindrical body of transfer tool 1 with the rims 16 of blades 12 and 14 interengaging with stator teeth 6 to align the blade gaps 15 with stator slots 7.

Referring particularly to FIG. 4, stripper 13 has a gear shaped body 17 connected to a piston drive, not shown by a rod 18 that extends through base 10 and centrally into the cylindrical body to the center of stripper body 17. The stripper serves to insert coils 2 through blade gaps 15, stator slot mouths 9 and into stator slots 7. For this purpose, stripper body 17 has a plurality of stripper teeth 19 that extend through blade gaps 15 and partially into mouths 9 of the stator slots. Between teeth 19 the stripper body circumference has grooved portions 20 to complement the inner surfaces of blades 12 so that stripper 13 is driven by the piston within the cylindrical body of apparatus 1 and rides along the surfaces of fixed blades 12. At several alternate grooved portions 20, or eight in the illustrated example, movable blades 14 are fixed as by set screws 21. These blades therefore move with the stripper between adjacent fixed blades 12, continually maintaining corresponding blade gaps 15.

Figure 2:
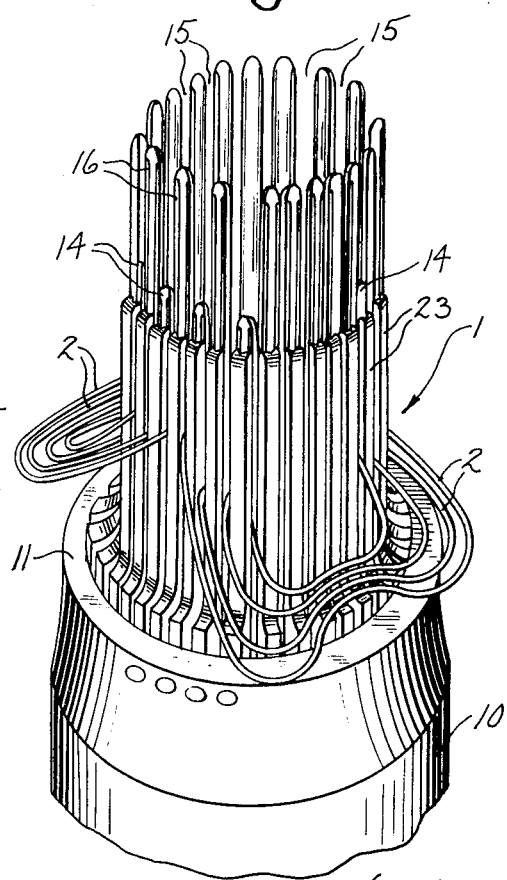
FIG. 2 is a partial perspective view of the apparatus with the stripper in a second position.

In the operation of this apparatus, shown as an example in FIGS. 1 and 2, eight prewound coils 2 are each inserted in appropriate pairs of blade gaps 15 so that the bottom end loops of the coils extend outwardly of the cylindrical body of apparatus 1 and top end loops of the coils extend across the top surface of stripper body 17 within the cylindrical body. In this example a two pole winding is desired and the coils are placed in gaps 15 which correspond to the stator slot positions that position the poles accordingly. With stripper 13 at this time in the low end of its stroke, the stator is then placed over tool 1. The piston operates the stripper to stroke through the cylinder and insert the coils.

In accordance with the invention, the positions of movable blades 14 are selected and arranged among the fixed blades so that at the separation of the coils or poles of fixed blade 12 is stationed, as at the blade designated by the numeral 22. This arrangement serves to avoid end turn blocking of the coils as stripper 13 strokes upward and stripper teeth 19 catch the elongated sides of the coil loops and thrust the sides of the loops through gaps 15 and into the slots as shown in FIG. 5. At the top end of the stroke, the tendency of the end loops of the coils to interfere with each other is avoided by the fact that the selected movable blades 14 confine the coils to their proper location. As well, due to the movable blades, friction is reduced on the coil wire as the stripper inserts each through a gap 15, thus reducing damage to the coils, and helping to avoid wedging of the coils in gaps 15.

After reaching the top of the stroke, stripper 13 is withdrawn, and the top end loops of the coils will bend back partially over the top of the stator to the positions shown in FIG. 3. The stator is then removed from transfer apparatus 1 and the bottom end loops of the coils bend across the bottom of the stator to complete the stator construction.

Further advantageous features of the invention are illustrated best in FIG. 5. Blade gaps 15 between fixed blades 12 and movable blades 14 are shaped slightly off-center. The blades are beveled or rounded at the gaps, and the radius of the curvature for fixed blades 12 differs slightly from the curvature radius of the movable blades 14 to provide this shape. In the illustrated example, the fixed blade radius is about 0.015 inch less than the radius of the movable blade curvature to provide a corresponding deviation from center in the gap.

Because the blade gaps 15 between fixed and movable blades 12 and 14 are off center, the teeth 19 of stripper 13 cause the coil wire to fan out and move toward the side and back of stator slot 7 as the wire is inserted through narrow mouth 9. The wire does not stack up in a column, but rather is more uniformly distributed so that a larger portion of the slot may be filled.

The off center blade gaps 15 also permit the use of coil transfer apparatus 1 with any of the usual wire diameters without experiencing wedging, locking or deformation of wire having diameters in a certain critical range determined by the blade gap width. The apparatus is thus usable without alterations for many different wire sizes to save considerable expense and production time.

Set screws 21 may be easily removed to remove movable blades 14 when it is desired to change the shape or width of the slots between blades. Although wires of many different wire sizes can be successfully inserted without changing blades 14, since the locking or wedging tendency is eliminated, the slot width remains as a limiting factor on the wire size, as when the wire strands have diameters greater than the gap widths. This could be a problem when, for example, it is desired to switch from winding copper wire coils to winding aluminum coils which must be nearly 50 percent larger to achieve the same quality of winding. By replacing the movable blades 14, the same apparatus 1 may be easily adapted for either the larger or smaller wire size.

Although forming no part of the invention here, in the actual operation of the transfer apparatus, a set of wedges, not shown, will be inserted in stator slots 7 to close the slots. A set of wedge holders 23 are fixed to base rim 11 and are adapted to temporarily hold the wedges for transfer into the slots in a well known manner.

The apparatus shown also has an index gear 24 which cooperates with a base apparatus, not shown, to adjust the angular position of the apparatus 1.

The coil transfer apparatus of the invention can be easily modified for construction of single phase and three phase motors by appropriate arrangement of movable blades on the stripper and removal of some of the fixed blades. The concepts illustrated by the straight slot device of the drawings can be applied as well for other types of stators, such as those where the stator windings are helical.

As described in connection with the illustrated embodiment, the invention thus improves on coil transfer devices to provide increased versatility, more uniform and efficient slot fill, and decreased damage or non-uniformity to the stator windings.

Various modes of carrying out the invention are contemplated as being within the scope of the following claims particularly pointing out and distinctly claiming the subject matter which is regarded as the invention.

I claim:

1. In a coil transfer apparatus for inserting coils in stator slots, the apparatus having a slotted cylindrical body defined by first elongated members spaced apart to provide elongated slots, and having a movable stripper within the cylindrical body with stripper teeth extending into the elongated slots; the improvement comprising: a plurality of second elongated members disposed alternately with first elongated members in the perimeter of the cylindrical body, the second elongated members being spaced from adjacent first elongated members to provide additional slots into which stripper teeth extend; and the first and second elongated members having beveled longitudinal edges with alternate radii of curvature to shape the slots off-center between the first and second elongating members.

2. The apparatus of claim 1, wherein the second elongated members are removable blades.

3. The apparatus of claim 2, wherein the beveled edges of the removable blades each have a radius of curvature larger than the radius of curvature for the first elongated members, to shape the slots between the first and second elongated members off-center toward the first elongated members.

4. The apparatus of claim 1, wherein the second elongated members are blades attached to the movable stripper and are movable between adjacent first elongated members, and wherein the elongated members are fixed within the cylindrical body.

5. The apparatus of claim 1, wherein the apparatus is adaptable for inserting any wire size that said elongated slots can accept, and wherein the second elongated members are blades removably attached to the movable stripper and are dimensioned in accordance with the size of the wire being inserted to provide the slots between the blades and the first elongated members with the optimum width for the wire being inserted.

* * * * *